(12) United States Patent
Hoppe

(10) Patent No.: US 6,362,820 B1
(45) Date of Patent: Mar. 26, 2002

(54) QUADRIC METRIC FOR SIMPLIFYING MESHES WITH APPEARANCE ATTRIBUTES

(75) Inventor: Hugues Hoppe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/339,640

(22) Filed: Jun. 24, 1999

(51) Int. Cl.[7] ............................................... G06F 15/00
(52) U.S. Cl. ...................................... 345/423; 345/419
(58) Field of Search ................................ 345/418, 419, 345/420, 423, 424; 382/125, 126

(56) References Cited

U.S. PATENT DOCUMENTS

| | | | | |
|---|---|---|---|---|
| 4,821,213 A | * | 4/1989 | Cline et al. | 364/522 |
| 5,428,717 A | * | 6/1995 | Glassner | 345/419 |
| 5,543,714 A | * | 8/1996 | Blanpain et al. | 324/345 |
| 6,262,739 B1 | * | 7/2001 | Migdal et al. | 345/423 |
| 6,263,091 B1 | * | 7/2001 | Jain et al. | 382/125 |

OTHER PUBLICATIONS

Hoppe et al., *Mesh Optimization*, Computer Graphics (SIGGRAPH '93 Proceedings) (1993), 19–26.

Garland and Heckbert, *Surface Simplification Using Quadric Error Metrics*, Computer Graphics (SIGGRAPH '97 Proceedings) (1997), 209–216.

Hoppe, *Progressive Meshes*, Computer Graphics (SIGGGRAPH '96 Proceedings) (1996), 99–108.

Popovic and Hoppe, *Progressive Simplicial Complexes*, Computer Graphics (SIGGRAPH '97 Proceedings) (1997), 217–224.

Garland and Heckbert, *Simplifying Surfaces with Color And Texture Using Quadric Error Metrics*, Visualization '98 Proceedings (1998), IEEE, 263–269.

* cited by examiner

Primary Examiner—Cliff N. Vo
(74) Attorney, Agent, or Firm—Woodcock Washburn LLP

(57) ABSTRACT

A quadric error metric is provided that allows fast and accurate geometric simplification of meshes having attribute values. In particular, the quadric error metric is used to determine the position of a new vertex created during an edge collapse, and the order in which edges are collapsed. In addition, the quadric error metric handles meshes with appearance attributes at their vertices, such as normals, colors, and texture coordinates. Thus, the quadric error metric can be used to simultaneously determine both the geometric position of a new vertex and the values of the appearance attributes associated with the new vertex.

20 Claims, 8 Drawing Sheets

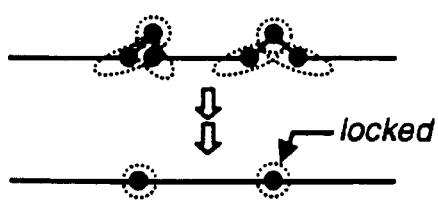
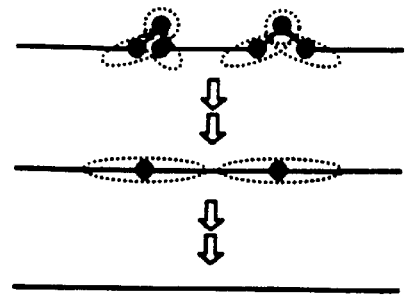
Fig. 7 (a)                    Fig. 7 (b)

QUADRIC METRIC FOR SIMPLIFYING MESHES WITH APPEARANCE ATTRIBUTES

FIELD OF THE INVENTION

The present invention relates generally to computer graphics systems using mesh representations of three-dimensional objects, and more particularly to improved mesh simplification techniques. Still more particularly, the present invention relates to an edge collapse transformation employing a new quadric error metric (QEM) for use in determining the geometric position of a new vertex created by the edge collapse, the values of appearance attributes associated with the new vertex, and the order in which edges are collapsed.

BACKGROUND OF THE INVENTION

In a computer graphics system, it is desirable to represent an object as efficiently as possible to preserve memory and system bandwidth, and to enhance rendering speed. Computer graphics, such as in computer generated images, animations and effects for motion pictures, television, computer multi-media, computer games, print and other media, often employ detailed geometric models for rendering images of three-dimensional (3D) objects. These models are typically created using commercially available computer-aided modeling and 3D scanning systems. Although some geometric models may be initially defined using high level primitives, for efficient rendering they are typically converted to their lowest common denominator form, polygonal approximations called meshes.

In the simplest case, a mesh consists of a set of vertices and a set of faces. Each vertex specifies the (x, y, z) coordinates of a point in space, and each face defines a polygon by connecting together an ordered subset of the vertices. These conjoined polygons approximate the surface geometry of the modeled object. The polygons may in general have arbitrary numbers of vertices (and even holes). For convenience, the special case of a mesh (called a "triangle mesh") in which all faces have exactly three vertices is commonly used. Arbitrary meshes composed of polygons having faces with any number of vertices equal to or greater than three can be easily converted to triangle meshes through known triangulation processes. Complex triangle meshes occur extensively in computer graphics as the result of geometric modeling operations, global illumination simulations, and reconstructions from 3D scans.

In the following discussion, the geometry of a triangle mesh is denoted by a tuple (K,V), where K is a simplicial complex specifying the connectivity of the mesh simplices (i.e., the adjacency of the vertices, edges, and faces), and $V=\{v_1, \ldots, v_m\}$ is the set of vertex positions $v_j=(x_j,y_j,z_j)$ defining the shape of the mesh in $R^3$. (See, e.g., Hoppe et al., Mesh Optimization, Computer Graphics (SIGGRAPH '93 Proceedings) (1993), 19–26 (hereinafter referred to as Hoppe93)). An exemplary mesh 80 is shown in FIG. 1. The vertices of a triangle mesh (e.g., vertices 82–89 of the mesh 80) are denoted as $v_1, \ldots, v_m$; the edges (e.g., 92–95) are denoted by pairs of adjacent vertices as $e=\{v_j,v_k\}$; and the faces (e.g., faces 100–107) are denoted by triples of interconnected vertices as $f=\{v_j,v_k,v_l\}$.

Complex (i.e., highly detailed) triangle meshes are notoriously difficult to render, store, and transmit. The meshes created by modeling and scanning systems are typically not optimized for display performance. In most applications, these initial meshes can usually be replaced by nearly indistinguishable approximations with far fewer faces, thereby improving rendering efficiency. One approach to speed up rendering is to replace a complex mesh by a set of level-of-detail (LOD) approximations. A detailed mesh is used when the object is close to the viewer, and coarser approximations (i.e., meshes with fewer vertices and faces) are substituted as the object recedes from the viewer in the image. These LOD approximations can be precomputed automatically using known mesh simplification methods. Thus, a fully detailed mesh is used when the object is close, and coarser approximations are substituted as the object recedes.

Because such meshes are difficult to store, transmit, and render, several techniques have been developed for geometrically simplifying them (see, e.g., Garland and Heckbert, Surface Simplification Using Quadric Error Metrics, Computer Graphics (SIGGRAPH '97 Proceedings) (1997), 209–216 (hereinafter referred to as Garland97); and Hoppe, Progressive Meshes, Computer Graphics (SIGGRAPH '96 Proceedings) (1996), 99–108 (hereinafter referred to as Hoppe96), both of which are incorporated herein by reference). Recent geometric simplification schemes coarsen a mesh through a sequence of edge collapse transformations 110, as shown in FIG. 1. These transformations have the advantage that their inverses can be stored concisely to form a progressive mesh representation as described in Hoppe96. Moreover, co-pending application titled Progressive Meshes, U.S. patent application Ser. No. 08/586,953, filed Jan. 11, 1996, commonly assigned and incorporated herein by reference (hereinafter referred to as Hoppe'953), describes a progressive mesh (PM) representation which provides a unified solution to the problems of efficiently storing, transmitting and rendering a mesh of arbitrary complexity. In short, the PM representation of an arbitrary mesh $\underline{M}$ is stored as a coarse or base mesh $M^0$ together with a sequence of n refinement records that indicate how to incrementally refine $M^0$ back up to the arbitrary mesh $\underline{M}$. Each refinement record encodes information associated with a vertex split transformation 116 that transforms the mesh by splitting a vertex 86' or $v_s$ (positioned between side vertices $v_l$ and $v_r$) to add one vertex 89 or $v_t$ and up to two faces ($f_l=\{v_s, v_t, v_l\}$ and $f_r=\{v_s, v_t, v_r\}$) to the mesh. The PM representation thus defines a continuous sequence of LOD approximations to the arbitrary mesh that are produced by applying the vertex split transformation defined by successive refinement records successively to the base mesh $M^0$, resulting in a sequence of progressively more detailed meshes $M^0 \ldots M^n$, $M^n=\underline{M}$. In other words, the PM representation of $\underline{M}$ thus defines a continuous sequence of meshes $M^0, M^1, \ldots, M^n$ of increasing accuracy from which LOD approximations with a desired complexity can be efficiently retrieved.

Thus, FIG. 1 shows the vertex split transformation 116 and its inverse, the edge collapse transformation 110. As shown in FIG. 1, each edge collapse transformation unifies two adjacent vertices into one (e.g., vertex 86' in mesh 112), thereby removing two faces (100 and 101) from the mesh. For the purpose of level-of-detail control, edge collapses are selected to best preserve the appearance of the mesh during simplification. Several appearance metrics have been developed and are described in, for example, Cohen et al., Appearance-Preserving Simplication, Computer Graphics (SIGGRAPH '98 Proceedings) (1998), 115–122; Garland97; and Hoppe96.

In a simplification scheme based on edge collapses, two issues are to be addressed: (1) the position and attributes values v to assign to the unified, or new, vertex $v_s$ 86', and (2) the order in which to perform edge collapses. A common approach is to define a single cost metric C to determine both. The unified vertex is assigned the value v that minimizes C(v), and the same cost C(v) is used to order the candidate edge collapses. Previous approaches to defining C(v) are described below.

Gueziec, Surface Simplification With Variable Tolerance, Proceedings of the Second International Symposium on Medical Robotics and Computer Assisted Surgery (November 1995), 132–139, constrains edge collapses to preserve mesh volume, and bounds the maximum geometric approximation error through a framework of tolerance volumes. Hoppe93 and Hoppe96 sample a set of points on the original mesh, and define C(v) as the sum of their squared distances to the approximating mesh. One drawback is that the subset of points that must be reprojected grows as the mesh is simplified. Kobbelt et al., A General Framework For Mesh Decimation, Proceedings of Graphics Interface '98 (1998), also sample points on the original mesh, but constrain their maximum distance to the approximating mesh, and use a fairness functional to order the edge collapses.

Ronfard and Rossignac, Full-Range Approximation Of Triangulated Polyhedra, Computer Graphics Forum (Proceedings of Eurographics '96) 15, 3 (1996), 67–76, associate to each original vertex the set of planes spanned by its adjacent faces, merge these sets of planes after each edge collapse, and define C(v) as the sum of squared distances from v to its associated planes. Again, a drawback is that these plane sets grow as the mesh is simplified. Garland97 shows that this same C(v) can be efficiently represented as a compact quadric error metric.

Lindstrom and Turk, Fast And Memory Efficient Polygonal Simplification, Visualization '98 Proceedings (1998), IEEE, 279–286, define C(v) as a sum of squared tetrahedral volumes between the two mesh neighborhoods of FIG. 1. Specifically, each tetrahedron is formed by the vertex $v_s$ 86' and a face f of the mesh 80. Because each tetrahedral volume is proportional to the distance of $v_s$ from the plane spanning f, the metric C(v) can be seen as an instance of a QEM over the neighborhood of mesh 80 where the metric on each face f of the mesh 80 is weighted by the squared area of f. A major difference from the earlier scheme of Garland97 is that the error metric is defined over the mesh simplified so far instead of the original mesh. This is referred to as the memoryless version of QEM simplification. Lindstrom and Turk also use constraints to preserve volume and boundaries.

Other techniques allow modification to a topological type of the mesh through a more general vertex unification transformation (see, e.g., Popovic and Hoppe, Progressive Simplicial Complexes, Computer Graphics (SIGGRAPH '97 Proceedings) (1997), 217–224; and Schroeder, A Topology Modifying Progressive Decimation Algorithm, Visualization '97 Proceedings (1997), IEEE, 205–212.

For realistic rendering of an object, meshes in computer graphics (including the continuous sequence of LOD meshes defined by the PM representation) often have numerous other appearance attributes in addition to their geometric properties (i.e., vertex positions and connectivity of vertices and polygons). These additional appearance attributes can be classified into two types, discrete attributes and scalar attributes.

The discrete attributes are usually associated with faces of the mesh. A common discrete attribute, the material identifier, determines the shader function used in rendering each face of the mesh. For instance, a trivial shader function may involve a straightforward look-up in a specified texture bitmap.

Many scalar attributes usually also are associated with a mesh. In general, the scalar attributes specify local parameters of the shader functions defined on the mesh faces. Typical examples include texture coordinates and normals that in simple cases are associated with vertices of the mesh. In the case of a simple shader function that projects a bitmap onto a face of the mesh (e.g., the texture bitmap specified by the discrete attribute associated with the face), texture coordinates that are represented as value pairs (u,v) and associated with the vertices of the face indicate locations in the text bitmap that project onto the respective vertices. Normals that indicate a direction perpendicular to the face at the vertex, such as with a value set $(n_x, n_y, n_z)$, may be used for more complex shading and/or lighting effects. Thus, meshes often have associated appearance attributes at their vertices, such as normals, colors, and texture coordinates. It should be noted that relatively few techniques account for these attributes during simplification.

Among mesh simplification metrics, the quadric error metric introduced by Garland97 is both fast and reasonably accurate. The more recent work, Garland and Heckbert, Simplifying Surfaces With Color And Texture Using Quadric Error Metrics, Visualization '98 Proceedings (1998), IEEE, 263–269 (hereinafter referred to as Garland98) generalizes this approach to deal with appearance attributes, and is incorporated herein by reference.

Bajaj and Schikore, Error-Bounded Reduction Of Triangle Meshes With Multivariate Data, SPIE 2656 (1996), 34–45, track geometric and attribute errors on faces of the mesh to obtain error-bounded simplifications of meshes with attributes. Hoppe96 extends the point sampling approach to include attributes in the cost metric, but decouples geometric optimization from attribute optimization when minimizing C(v). Garland98 generalizes the QEM scheme of Garland97 to deal with surface properties. The present invention is directed to another, more intuitive generalization that is more accurate and efficient.

Cohen et al. simplify meshes with explicit texture coordinates. By tracking parametric instead of geometric correspondence, their scheme bounds the displacement of a point on the mesh with any given texture coordinate, which is the preferred metric for texture-mapped surfaces. The present invention seeks to minimize the attribute deviation at any given point on the surface. This is the correct metric for vertex attributes like colors and normals that do not define a parametrization on the surface.

There are applications involving computer graphics in which it is necessary or desirable to provide efficient and accurate geometric simplification of meshes. Accordingly, a goal of the present invention is to provide an improved error metric for use in carrying out mesh simplification, and particularly edge collapse, transformations of the kind discussed above.

SUMMARY OF THE INVENTION

The present invention provides systems and methods for determining a quadric error metric for use in determining the positions of new vertices created by edge collapse transformation, the values of appearance attributes associated with such new vertex, and the order in which edges are collapsed. The appearance attributes may include normals, colors, and/or texture coordinates.

In accordance with the present invention, the quadric error metric may be minimized to determine the most desirable position and attribute values for each new vertex. Both the geometric position of the vertex 86' and its attributes are determined simultaneously. Indeed, the attribute field over the mesh neighborhood 80 can affect the position of the unified vertex 86'. For example, one can consider the case in which the neighborhood 80 is completely planar. In that case, the position p of the unified vertex 86' can lie anywhere in the plane and still give rise to zero geometric error. However, the attribute field over the mesh 80 may have a sharp gradient, which influences the position of the vertex.

A geometric error as a function of the vertex position p is created in the form of a QEM represented by (A,b,c) coefficients. Then, an attribute error as a function of both vertex position p and attributes s is created in the form of another QEM. These QEM's are defined initially for each face f 100–107 and then summed. Thus the final QEM for the vertex v=(p,s) 86' is the sum over all faces 100–107 and over both geometric error and attribute errors.

Having formed this one summed QEM (by summing up the corresponding coefficients in the (A,b,c) representations of the individual QEM's), its minimum is computed; that is, the position p and attributes s for vertex 86' that minimize the QEM are obtained.

The inventive quadric error metric is the sum of the geometric error and the attribute error. The geometric error may be defined as the sum of the squared distances from a point in space (the new vertex) to each of the closest points on the planes associated with the collapsed edge, where the associated planes are the planes spanned by the faces adjacent to the collapsed edge. The attribute error is itself a function the geometric position of the new vertex, and may be represented by a relatively sparse matrix comprising an m×m identity matrix, which provides improved computational efficiency.

Additional features and advantages of the invention will be made apparent from the following detailed description of an illustrated embodiment.

BRIEF DESCRIPTION OF THE DRAWINGS

FIG. 4(*b*) is a flow chart of an exemplary method of determining a vertex position and its attribute value(s) for an edge being collapsed in accordance with the present invention.

FIGS. 7(*a*) and 7(*b*) are diagrams of quadric error metric simplification with and without the memoryless technique, respectively, in accordance with the present invention.

DETAILED DESCRIPTION OF THE ILLUSTRATED EMBODIMENTS

Overview

Figure 1:
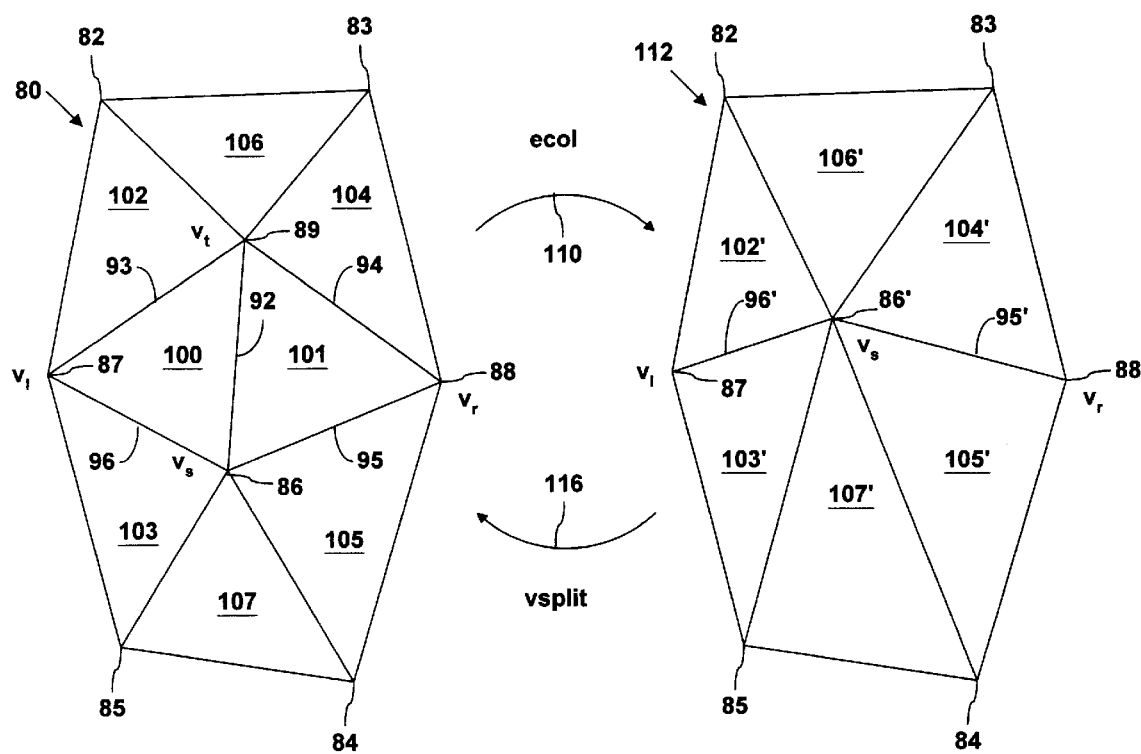
FIG. 1 is a diagram of portions of example initial and resulting triangle meshes illustrating two inverse mesh transformations, an edge collapse operation, and a vertex split operation in accordance with the present invention.

In a computer graphics system, it is desirable to represent an object as efficiently as possible to preserve memory and system bandwidth, and to enhance rendering speed. When rendering an image of a three-dimensional object, it is possible to reduce the amount of data needed to represent the geometry of the object without significantly impairing the quality of the resulting image, by using a simplified mesh created by collapsing selected edges of a higher resolution mesh, as described above. The present invention relates to a quadric error metric, or QEM, that allows fast and accurate geometric simplification of meshes having appearance attributes (such as normals, colors and texture coordinates) at their vertices. In particular, the quadric error metric is used to determine the position and attributes of a new vertex created during an edge collapse, and the order in which edges are collapsed. Thus, the quadric error metric may be used to determine both the geometric position of a new vertex and the values of the appearance attributes associated with the new vertex.

The new vertex is the result of an edge collapse. The present invention simultaneously determines the position (denoted p) and attribute values (denoted s) for the vertex v=(p,s) using a single accumulated QEM.

The quadric error metric is the sum of a geometric error and an attribute error. The geometric error may be defined as the sum of the squared distances from a point in space (the new vertex) to each of the geometric closest points on the planes associated with the collapsed edge, where the associated planes are the planes spanned by the faces 100–107 adjacent to the collapsed edge.

The squared distance from a point v=p to a plane can be expressed as a quadric function Q(v). Because the sum of two quadrics is also a quadric, the sum of squared distances from a point v to a set of planes can also be expressed as another quadric function Q(v). Finding the position v minimizing Q(v) amounts to solving a linear system on v. In addition to measuring the squared distance of p to each of a set of planes, the squared deviation of s from the attribute value interpolated at the location on the plane onto which p projects is also determined. The attribute error can be expressed as a quadric function Q(p,s), where Q(p,s) is defined as the sum of the geometric error and the attribute error. A linear system on v=(p,s) is solved to determine a v=(p,s) that minimizes Q(p,s), thereby giving the desirable position and attribute values.

More particularly, in accordance with the present invention, the attribute error is obtained by projecting the vertex v 86', having an unknown position p and an unknown attribute value s, onto the planes of the original faces of the mesh at the geometric closest points. The attribute value s' at the geometrically closest point on each plane is determined by interpolating the attribute values from the vertices at that point on the plane. A linear system is then solved for the most desirable attribute value s at the point v. s and v are solved simultaneously as the solution of the linear system (which minimizes the quadric error metric). It should be noted that the point is p, the attribute is s, and the two combined are v. The attribute error is determined by squaring the deviation between the attribute value s at v and the attribute value s' at the geometrically closest point on the face.

By using the geometrically closest point on the face of the mesh in determining the attribute error, the present invention provides the advantages of requiring less storage and faster evaluation time (both due to computational efficiencies provided by the invention), and more accurate simplified meshes (by not underestimating the error).

Appearance attributes are not always continuous over the surface of the mesh. To deal with attribute discontinuities (such as creases), a wedge-based mesh data structure is used. The present invention also provides two enhancements to the quadric simplification scheme: memoryless simplification and volume preservation, both of which are explained below.

Exemplary Operating Environment

Figure 2:
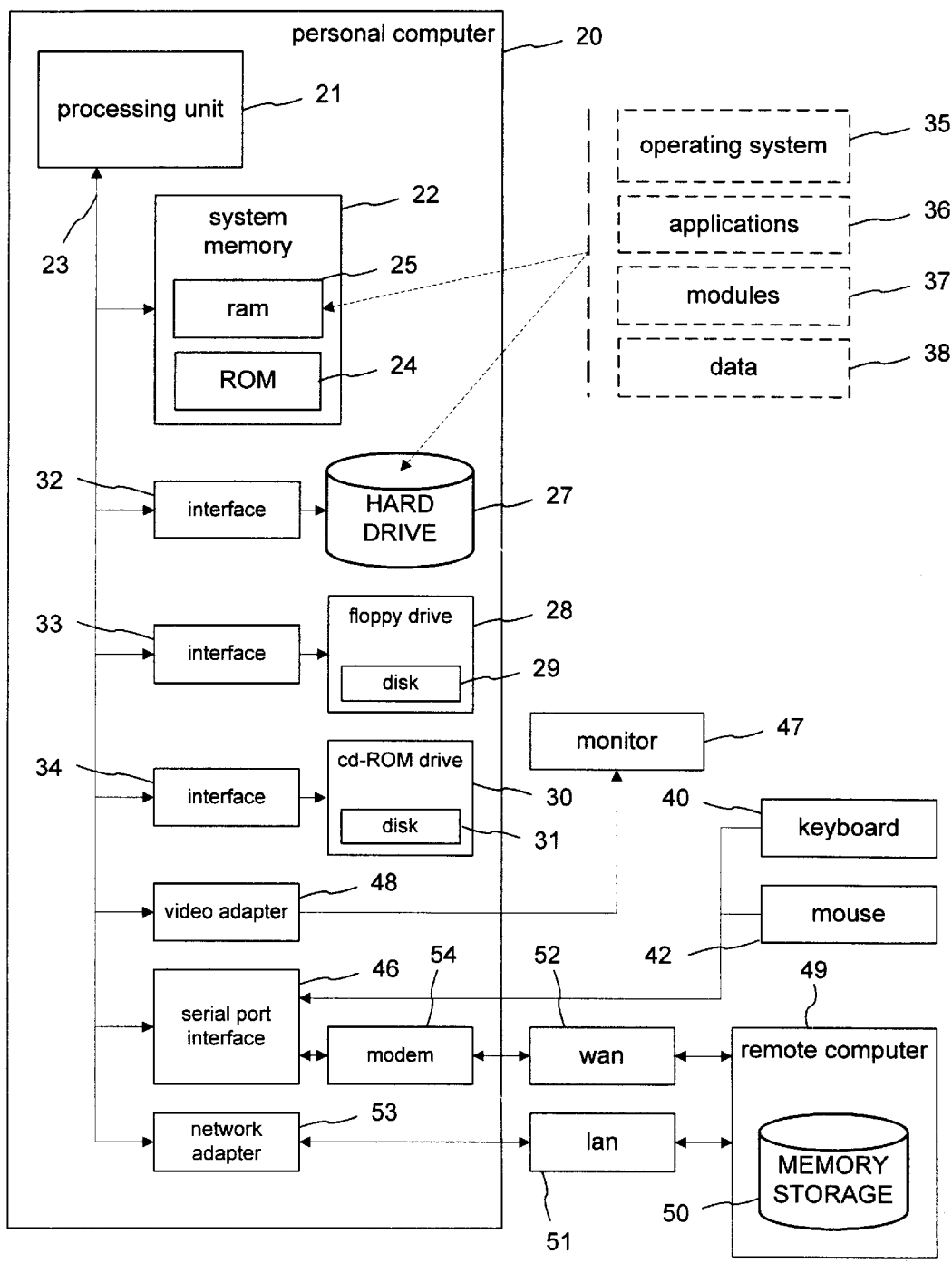
FIG. 2 is a block diagram of a computer system that can be used to implement a method and apparatus embodying the invention.

FIG. 2 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. However, some embodiments of the invention can be practiced on standalone computers. In a distributed computing environment, program modules may be located in both local and remote memory storage devices.

With reference to FIG. 2, an exemplary system for implementing the invention includes a conventional personal computer 20, including a processing unit 21, a system memory 22, and a system bus 23 that couples various system components including the system memory to the processing unit 21. The processing unit may be any of various commercially available processors. Dual microprocessors and other multiprocessor architectures also can be used as the processing unit 21.

The system bus may be any of several types of bus structure including a memory bus or memory controller, a peripheral bus, and a local bus using any of a variety of conventional bus architectures. The system memory includes read only memory (ROM) 24 and random access memory (RAM) 25. A basic input/output system (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the personal computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Overview of the Quadric Error Metric

As described above, the quadric error metric is used to determine the position and attributes of a new vertex during an edge collapse to provide mesh simplification.

Notation

A triangle mesh M is described by a set of vertices V and its set of faces F. Each vertex $v \in V$ has a geometric position $p_v \in R^3$ and a set of m attribute scalars denoted by $s_v \in R^m$. These two elements form a column vector $$v_v = \binom{p_v}{s_v} \in R^{3+m}.$$

Arbitrary vectors in $R^{3+m}$ are referred to using the notation $$v = \binom{p}{s} \in R^{3+m}.$$

Thus, a mesh with (r,g,b) vertex colors has m=3, and a mesh with both colors and normals has m=6. Each triangle face $f \in F$ is denoted as a vertex triplet $(v_1, v_2, v_3)$.

Simplification of geometry

The quadric error metric scheme described in Garland97 addresses the case of when m=0. It defines on each face f of the original mesh a quadric $Q^f(v)$ equal to the squared distance of a point $v=(p) \in R^3$ to the plane containing the face. (The derivation of $Q^f$ is described below). Each vertex v of the original mesh is assigned the sum of quadrics on its adjacent faces weighted by face area:

$$Q^v(v) = \sum_{f \ni v} \text{area}(f) \cdot Q^f(v) \qquad (1)$$

After each edge collapse $(v_1, v_2) \to v$, the new vertex v is assigned the position v minimizing $Q^v(v) = Q^{v_1}(v) + Q^{v_2}(v)$, and the next edge collapse chosen is the one with the lowest such minimum.

To derive $Q^f(v)$ for a given face $f=(v_1, v_2, v_3)$, recall that $v=(p)$ when m=0. The signed distance of p to the plane $P \subset R^3$ containing f is $n^T p + d$, where the face normal $n = (p_2 - p_1) \times (p_3 - p_1)/\|(p_2 - p_1) \times (p_3 - p_1)\|$ and the scalar $d = -n^T p_1$. (The normal n is a column vector of size 3.) Another method of obtaining n and d is to solve the linear system $$\begin{pmatrix} p_1^T & 1 \\ p_2^T & 1 \\ p_3^T & 1 \end{pmatrix} \binom{n}{d} = \begin{pmatrix} 0 \\ 0 \\ 0 \end{pmatrix}$$

with the additional constraint that $\|n\|=1$. The squared distance between point p and plane P is therefore $Q^f(v=(p)) = (n^T v + d)^2 = v^T (nn^T) v + 2d n^T v + d^2$, which can be represented as a quadratic functional $v^T A v + 2 b^T v + c$, where A is a symmetric 3×3 matrix, b is a column vector of size 3, and c is a scalar. Thus, $Q^f = (A, b, c) = ((nn^T), (dn), d^2)$ can be stored using 6+3+1=10 coefficients.

After an edge collapse, the vertex position $v_{min}$ minimizing $Q^v(v)$ is found where the gradient $(\nabla Q^v(v) = 2Av + 2b)$ equals zero, which is obtained by solving the linear system in Equation (2) with A and b defined by the system.

$$Av_{min} = -b \qquad (2)$$

Simplification of geometry and attributes

Garland98 extends the framework of Garland97 to deal with vertex attributes (m>0) and is incorporated herein by reference. Garland98 generalizes the distance-to-plane metric in $R^3$ to a distance-to-hyperplane in $R^{3+m}$. That is, $Q^f(v)$ for $$v = \binom{p}{s} \in R^{3+m}$$

is defined as the distance in $R^{3+m}$ from v to the affine subspace $P' \subset R^{3+m}$ spanned by the three vertices $(v_1, v_2, v_3)$.

Let v' denote the projection of v onto this affine subspace. The error $Q^f(v) = \|v - v'\|^2$ is the sum of two terms, the geometric distance error $\|p - p'\|^2$ and the attribute deviation error $\|s - s'\|^2$. It should be noted that the point p' does not correspond to the projection of p onto the plane $P \subset R^3$ as it did previously. The effect is that v is generally not compared to the geometrically closest point, but to some farther point that has a closer attribute value. As a consequence, the metric may underestimate the actual error.

The quadric $Q^f(v)$ consists of a matrix A of size (3+m)×(3+m), a column vector b of size 3+m, and a scalar c. Because the matrix A resulting from the above formulation is dense (whereas the matrix of the present invention is sparse, as discussed below), storage of Q requires a total of (4+m)(5+m)/2 coefficients, which is quadratic on m.

To trade off geometric accuracy and attribute accuracy, the user specifics for each attribute $j \in \{1 \ldots m\}$ a relative importance weight $\lambda_j$ that pre-multiplies the attribute values, effectively scaling some axes in $R^{3+m}$. For scale-invariance, the mesh is resized to tightly fit in the unit cube.

The Quadric Error Metric of the Present Invention

The quadric error metric of the present invention defines both geometric error and attribute error based on geometric correspondence in three dimensions.

Figure 3:
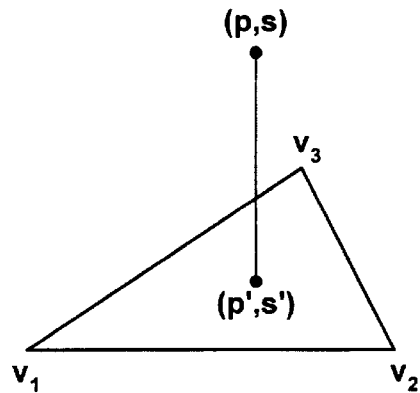
FIG. 3 is a diagram that shows the correspondence between a point p having attribute s and its projection onto the plane spanning ($v_1$, $v_2$, $v_3$) in accordance with the present invention.

An exemplary method for determining the QEM will now be described. A hypothetical point p is selected above a face of the mesh. In other words, if the vertex were to have position p, then it would project onto the face at point p' which would have an interpolated attribute value s'. The QEM that is formed is an error term where both the position p and attribute value $s_j$ are unknown. FIG. 3 is used as an illustration to define this QEM as a function of both p and s, but the emphasis is that p is not known yet. The face has vertices $(v_1, v_2, v_3)$. The point p is projected onto the face at its geometric closest point p'. The point p has a predicted or expected attribute value s that is determined in accordance with a linear functional defined below.

The geometric error is then determined to be equal to the squared distance from the point p to the projected point p'. More particularly, the geometric error term is a zero-extended version of that in Garland97:

$$Q_p^f = \left( \left( \begin{array}{c|c} nn^T & \cdots 0 \cdots \\ \hline \cdots 0 \cdots & \cdots 0 \cdots \end{array} \right), \binom{dn}{0}, d^2 \right) \qquad (3)$$

where the line dividers in A and b mark the first three rows and three columns.

An interpolated attribute value s' is then determined. The interpolated attribute value s' is determined by interpolating the attribute values from the three vertices of the face. Next, the attribute error is then determined to be equal to the squared difference between s and s'. More particularly, to form the attribute error term $Q^f_{sj}$, a linear functional $\hat{s}_j(p) = g_j^T p + d_j$ is defined to represent the expected attribute value at all points $p \in R^3$ (i.e., the predicted attribute value at any point in space). The gradient $g_j$ and scalar $d_j$ are defined as follows. Naturally, $\hat{s}_j(p)$ should interpolate the face vertices $$f = \left( \begin{pmatrix} p_1 \\ s_1 \end{pmatrix}, \begin{pmatrix} p_2 \\ s_2 \end{pmatrix}, \begin{pmatrix} p_3 \\ s_3 \end{pmatrix} \right)$$

and thus match the linear interpolant over the plane P. In addition, $\hat{s}_j(p)$ for an arbitrary $p \in R^3$ should be identical to the value $\hat{s}_j(p')$ at its geometric projection on P; this is equivalent to setting $n^T g_j = 0$. Parameters $(g_j, d_j)$ can thus be computed by solving the 4×4 linear system $$\begin{pmatrix} p_1^T & 1 \\ p_2^T & 1 \\ p_3^T & 1 \\ n^T & 0 \end{pmatrix} \begin{pmatrix} g_j \\ d_j \end{pmatrix} = \begin{pmatrix} s_{1,j} \\ s_{2,j} \\ s_{3,j} \\ 0 \end{pmatrix}$$

Because $Q_{sj}^f(v) = (\hat{S}_j(p) - s_j)^2 = (g_j^T p + d_j - s_j)^2$, the following equation is obtained through algebraic rearrangement:

$$Q_{sj}^f = \left( \begin{pmatrix} g_j g_j^T & \cdots 0 \cdots & -g_j & \cdots 0 \cdots \\ \cdots 0 \cdots & \cdots 0 \cdots & 0 & \cdots 0 \cdots \\ -g_j^T & \cdots 0 \cdots & 1 & \cdots 0 \cdots \\ \cdots 0 \cdots & \cdots 0 \cdots & 0 & \cdots 0 \cdots \end{pmatrix}, \begin{pmatrix} d_j g_j \\ 0 \\ -d_j \\ 0 \end{pmatrix}, d_j^2 \right) \quad (4)$$

where the value 1 appears in $A_{3+j,3+j}$ and the value $-d_j$ appears in $b_{3+j}$. Thus, $Q_{sj}^f$ may be represented by an m×m matrix. When considering a single attribute value $s_j$, the m×m matrix contains only a single non-zero entry (the '1' above). When summing over all attribute values $s_1 \ldots s_m$, the m×m matrix becomes the identity matrix, which provides improved computational efficiency.

The above steps are repeated, if an edge is being collapsed, for each of the planes of the faces associated with the collapsed edge, where the associated planes are the planes spanned by the faces adjacent to the collapsed edge.

The geometric error and the attribute error are summed to determine the quadric error metric. More particularly, the error metric for a face f is defined as the sum of the geometric error and the attribute error, or $$Q^f \left( v = \begin{pmatrix} p \\ s \end{pmatrix} \right) = Q_p^f(v) + \sum_{j=1}^{m} Q_{sj}^f(v)$$

where the geometric error $Q_p^f(v)$ is the squared distance from p to its projection p' on the plane $p \subset R^3$ containing f, and the attribute error $Q_{sj}^f(v)$ is the squared deviation between s and the value s' interpolated from face f at that projected point p', as shown in FIG. 3.

In other words, summing these quadrics together (Equations (3)+(4)) yields $$Q^f = \left( \begin{pmatrix} nn^T + \sum_j g_j g_j^T & -g_1 & \cdots & -g_m \\ -g_1^T & & & \\ \vdots & & I & \\ -g_m^T & & & \end{pmatrix}, \begin{pmatrix} dn + \sum_j d_j g_j \\ -d_1 \\ \vdots \\ -d_m \end{pmatrix}, d^2 + \sum_j d_j^2 \right)$$

Note again that the first three rows and the first three columns of A are dense, but that the remaining m×m submatrix is the identity I. Recall that a set of weights $\lambda_j$ is used to scale attribute errors relative to geometric error. If one were to define $Q = Q_p + \Sigma_j \lambda_j^2 Q_{sj}$, the submatrix would have the weights $\Sigma_j^2$ on its diagonal. A simpler approach of pre-scaling the attribute values $s_j$ by $\lambda_j$ prior to constructing and evaluating Q is used. In either case, the m×m submatrix is a constant matrix times a scalar factor, and thus uses only one coefficient of storage. Overall, Q requires 11+4m coefficients, which is now linear on m (see Table 1).

TABLE 1

Number of coefficients used to represent Q for various numbers m of scalar attributes, for the previous scheme of Garland98 and for the scheme of the present invention.

| Example | m | Garland98 | Present Invention |
|---|---|---|---|
| geometry | 0 | 10 | 10 |
| + color | 3 | 28 | 23 |
| + normals | 6 | 55 | 35 |
| + texture coord. | 8 | 78 | 43 |
| in general | m > 0 | (4 + m)(5 + m)/2 | 11 + 4 m |

After the QEM has been determined, it can be minimized to determine the geometric position of a new vertex and the values of the appearance attributes associated with the new vertex. Minimizing the QEM provides the best geometric position and the best attribute values of the new vertex. More particularly, with respect to FIG. 4(a), at step 200, a QEM is formulated as a matrix function of position and attribute values, as described above. The QEM is then minimized at step 210 to determine the values of the position and attribute(s) of the new vertex.

Figures 4A, 4B:
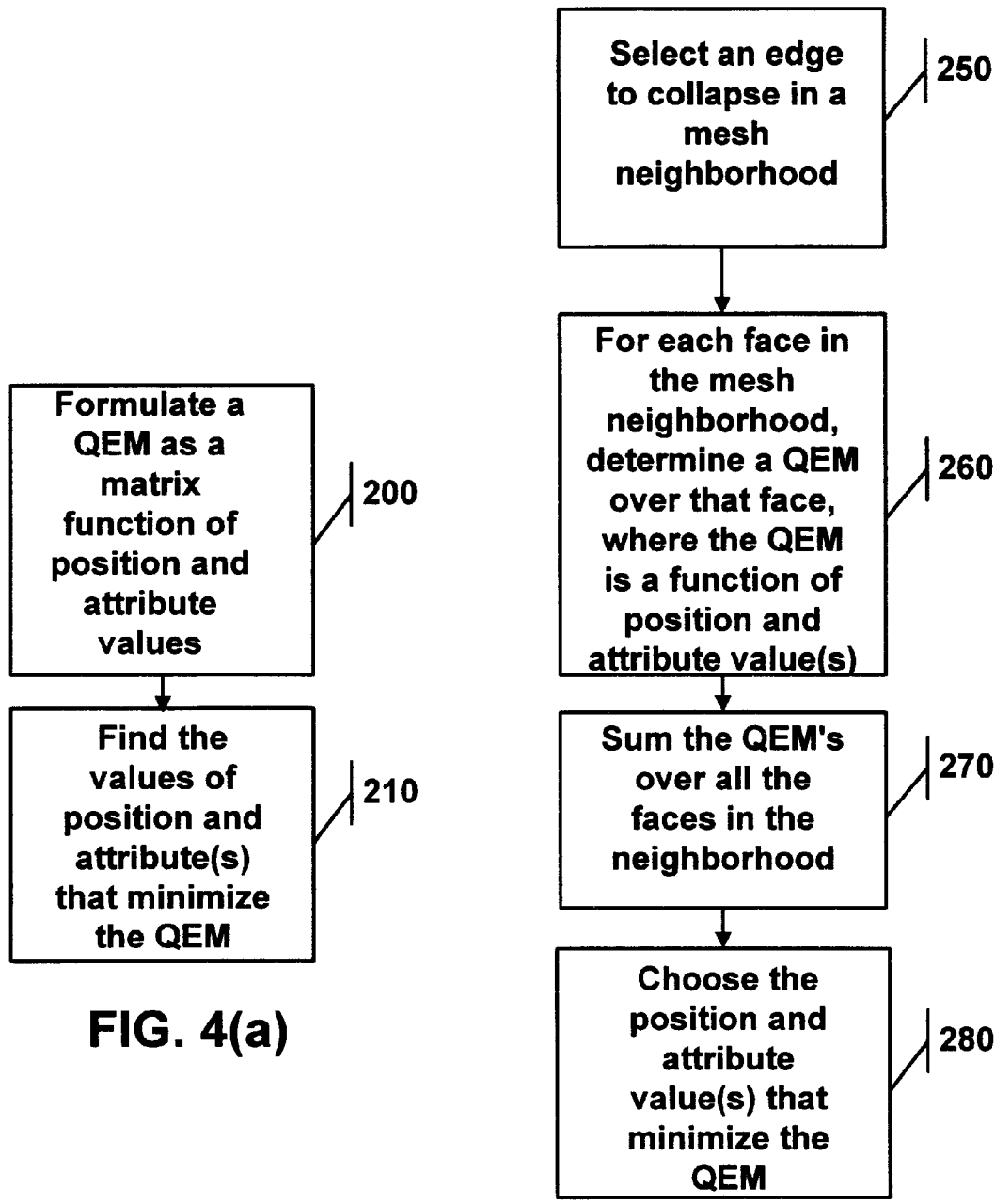
FIG. 4(*a*) is a flow chart of an exemplary method of determining a vertex position and its attribute value(s) in accordance with the present invention.

FIG. 4(b) is a flow chart of an exemplary method of determining a point 15 and its attribute value(s) for an edge being collapsed in accordance with the present invention. At step 250, an edge to be collapsed is selected. At step 260, for each face in the mesh neighborhood, a QEM is determined over that face, as described above. The QEM's are summed over all the faces in the mesh neighborhood at step 270, and the QEM is minimized at step 280 to determine the position and the attribute value(s) of the new vertex.

Some attributes, such as color channels, have bounded extents (e.g., $0 \leq r,g,b \leq 1$). The $v_{min}$ found in Equation (2) may contain attributes outside these linear inequality constraints. A fallback strategy when this occurs could be to solve a more expensive "constrained quadratic programming" problem. The inventor has chosen to simply truncate the attributes to their bounds and re-evaluate $Q^v(v)$ there. Similarly, surface normal attributes should remain normalized. However, quadratic minimization subject to quadratic constraints is an even more difficult problem, so again these attributes are left unconstrained and the optimized values are renormalized.

Meshes with Attribute Discontinuities—Wedges

Meshes often have attribute discontinuities, such as surface creases and material boundaries, that require multiple attribute vectors per vertex. A crease is a path of edges on a mesh across which normals are discontinuous. The present invention includes a wedge-based mesh data structure that captures such discontinuities efficiently and permits simultaneous optimization of these multiple attribute vectors. Prior work on quadric error metrics has associated such metrics with vertices of the mesh, and this does not allow the simplification of meshes with attribute discontinuities.

Figure 5:
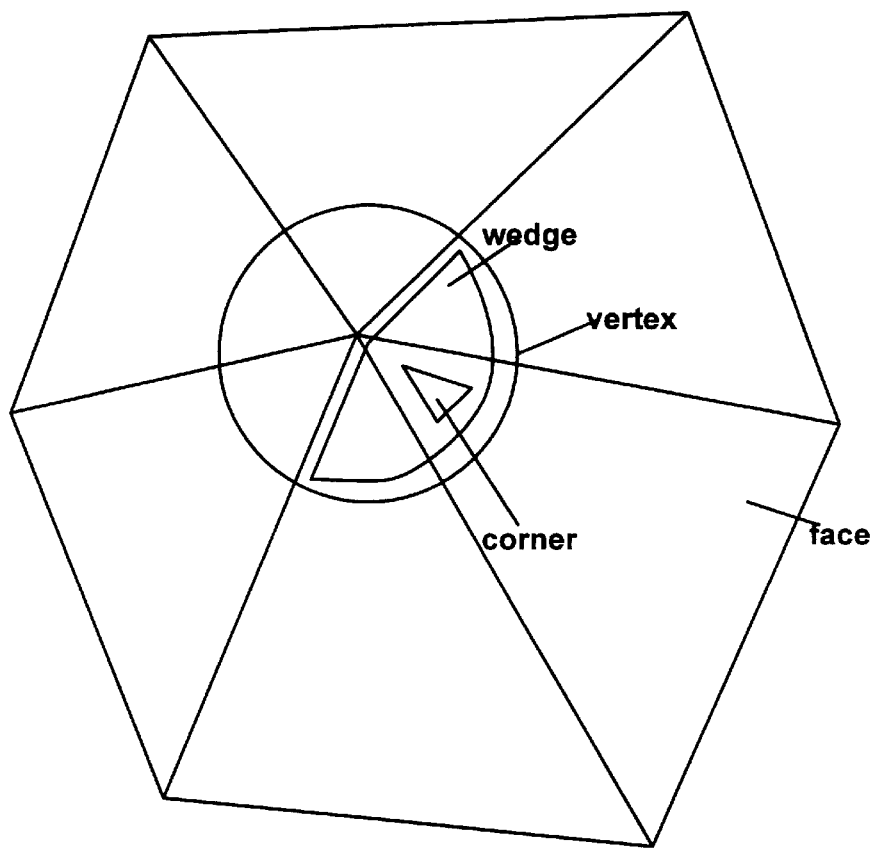
FIG. 5 is a diagram of a wedge-based representation in accordance with the present invention.

Modeling attribute discontinuities involves storing multiple sets of attribute values per vertex. An exemplary wedge-based mesh representation is shown in FIG. 5 and described in co-pending U.S. patent application titled Storage Of Appearance Attributes In Association With Wedges In A Mesh Data Model For Computer Graphics, Ser. No. 09/035,651, filed Mar. 5, 1998, which is hereby incorporated by reference.

In accordance with the present invention, a vertex is partitioned into k≧1 wedges, each wedge $w_i$ having its own attribute vector $s^i$. The corner of each face adjacent to the vertex is assigned to one of the wedges. The quadric $Q^{wi}(p,s^i)$ at wedge $w_i$ is the area-weighted sum of $Q^f$ for its subset of adjacent faces, $$Q^w(v) = \sum_{f \ni w} \text{area}(f) \cdot Q^f(v), \quad (5)$$

and Equation (1) is replaced by $$Q^v(p, s^1, \ldots, s^k) = \sum_{i=1}^{k} Q^{wi}(p, s^i) \quad (6)$$

The new vertex quadric $Q^v$ has dimension 3+km. Note that this variable-sized quadric $Q^v$ need never be stored explicitly in the mesh, as it is straightforward to construct from the $Q^{wi}$ when an edge collapse is considered. Minimizing this quadric $Q^v$ produces both the vertex position and all of its wedge attributes simultaneously.

Figure 6:
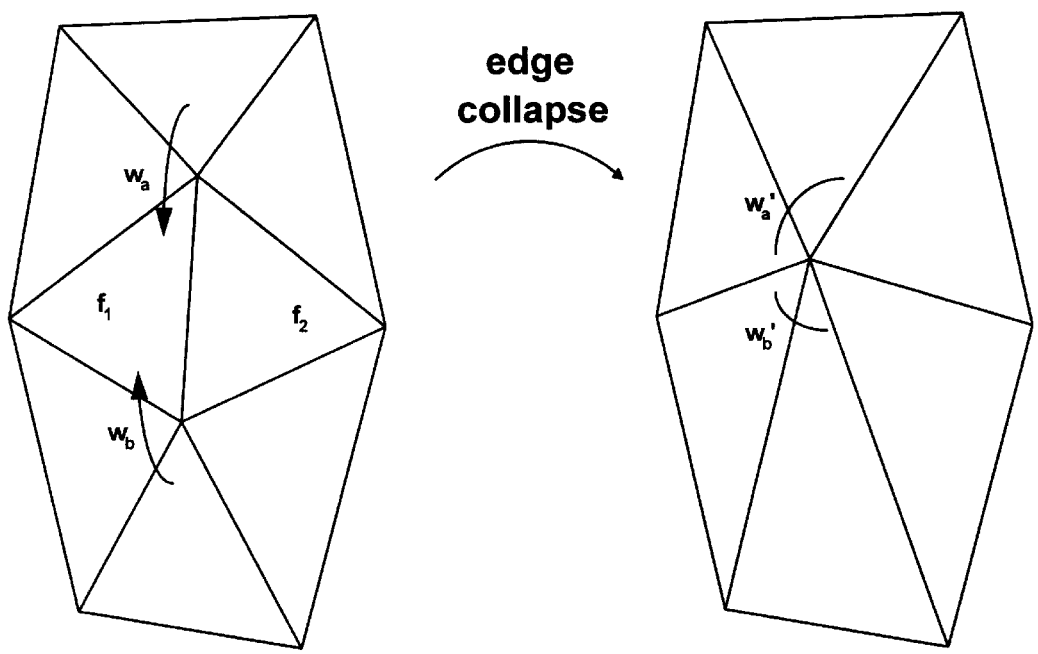
FIG. 6 is a diagram showing wedge unification testing after edge collapse in accordance with the present invention.

For an edge collapse, the earlier strategy of merging vertex quadrics as $Q^v(v)=Q^{v1}(v)+Q^{v2}(v)$ is redefined to act on wedge quadrics instead. Referring to FIG. 6, wedges $w'_a$ and $w'_b$ are unified together if both $w_a$ and $w_b$ extend into face $f_1$, and similarly on the other side for face $f_2$. For each pair of unified wedges (0, 1, or 2 pairs), their wedge quadrics are summed together. These rules reproduce the original scheme when both vertices $v_1$ and $v_2$ each have a single wedge.

The geometry of discontinuity curves is preserved by associating an additional quadric with every sharp edge (including boundary edges), as described in Garland98. In accordance with the present invention, the edge quadric is added to the $Q^w(v)$ on the four corners adjacent to the edge (or two corners in the case of a boundary edge).

Enhancements

Memoryless simplification and volume preservation techniques further improve the results of the QEM of the present invention.

Memoryless simplification

Instead of assigning $Q^w(v)$ to wedges in the original mesh and propagating these through each edge collapse, the alternative approach of memoryless simplification has been used, in which $Q^w(v)$ is redefined based on the geometry and attributes of the mesh simplified so far. Thus, when evaluating an edge collapse $(v_1, v_2) \rightarrow v$, $Q^v(v)$ is computed using Equations (5) and (6) over the set of faces 100–107 in FIG. 1. As described above, the squared tetrahedral volumes used in Lindstrom and Turk give rise to a similar metric except that it weights each $Q^f$ by the square of its face area.

As shown in the results below, memoryless simplification improves the accuracy of results. Although this seems counter-intuitive, it is explained with respect to FIGS. 7(a) and 7(b). In FIGS. 7(a) and 7(b), the dashed oval represent the shapes of the quadric functions. In the standard scheme (FIG. 7(a)), the quadric functions are computed in a pre-process and subsequently summed during simplification. In the memoryless scheme (FIG. 7(b)), the quadric functions are computed using the mesh as it has been simplified thus far. Essentially, with memoryless simplification, small details at the fine level are disregarded when simplification proceeds to the coarser levels, and this can be beneficial.

Although memoryless simplification makes storing QEM's unnecessary, to speed up the technique, the present inventor has found it useful to cache the values area $(f) \cdot Q^f(v)$ on the faces of the mesh, updating them appropriately as edges are collapsed. Evaluating the cost of a candidate edge collapse then simply involves the sums of Equations (5) and (6). For this reason, the compact size of the QEM of the present invention is still advantageous.

Volume preservation

Figure 8:
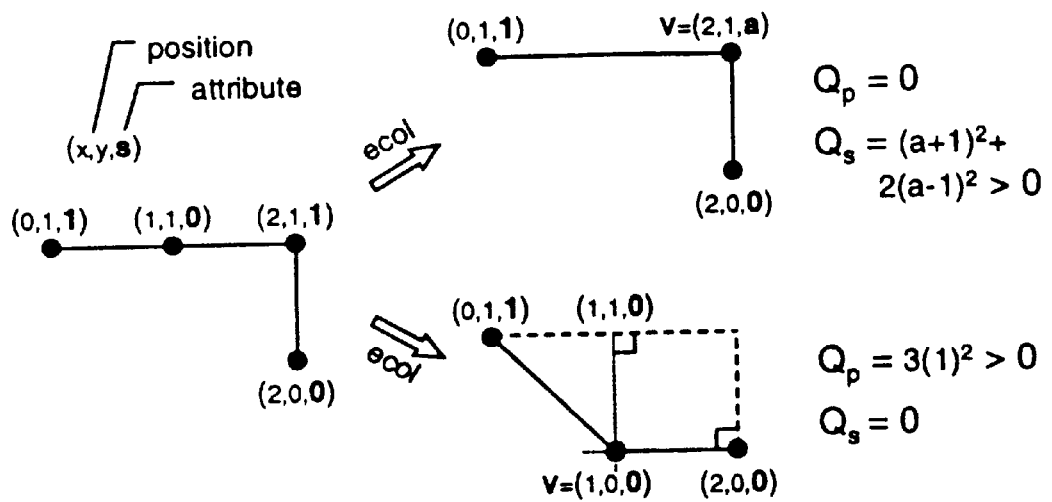
FIG. 8 is a diagram illustrating a trade-off between geometric accuracy and attribute accuracy for a polygonal curve in accordance with the present invention.

The inventor has determined that the QEM of the present invention sometimes shrinks the model geometry in areas of high attribute gradient. That is, the new vertex v may be pushed towards the center of curvature of the surface at sharp attribute transitions. The intuition for this effect is illustrated in FIG. 8 using simplification of a polygonal curve in $R^2$. The scalar field defined over the original model transitions from 1 to 0 to 1 to 0. After the edge collapse on the upper right, the geometry is preserved exactly ($Q_p=0$), but the attribute error $Q_s$ cannot be made zero. On the other hand, the edge collapse on the lower right results in geometric error ($Q_p>0$), but achieves $Q_s=0$ since the projection of v onto each of the original three line segments substantially exactly reproduces the original attributes.

To counteract this bias towards geometric shrinkage, a volume preservation constraint is used. As shown in Gueziec and Lindstrom and Turk, preserving volume during an edge collapse is equivalent to a linear constraint $g^T_{VOL}p+d_{VOL}=0$ on the position p of the unified vertex v. The volumetric gradient $g_{VOL}$ is the sum of the face normals of faces 100–107 (FIG. 1) weighted by one third of their face areas. Minimizing $Q^v(v)$ subject to that linear constraint is achieved using a system with one Lagrange multiplier γ:

$$\begin{pmatrix} A & g_{VOL} \\ g^T_{VOL} & 0 \end{pmatrix} \begin{pmatrix} v_{\min} \\ \gamma \end{pmatrix} = \begin{pmatrix} -b \\ -d_{VOL} \end{pmatrix}$$

This system (or even that of Equation (2)) may be ill-conditioned if the mesh neighborhood has zero Gaussian curvature, i.e., if it is planar or cylindrical. Note that the attributes cannot contribute any zero singular values because the k submatrices of size mxm on the diagonal of A are all the identity I. When the system is ill-conditioned, p is set equal to $(p_1+p_2)/2$ and $\{s_1, \ldots, s_k\}$ is solved for in the remaining system.

Results

Results of quantitative testing of all the combinations indicate that the quadric metric of the present invention, memoryless simplification, and volume preservation all contribute to improved accuracy. The simplified meshes are generally more accurate, with respect to both geometry and attributes.

Figure 9:
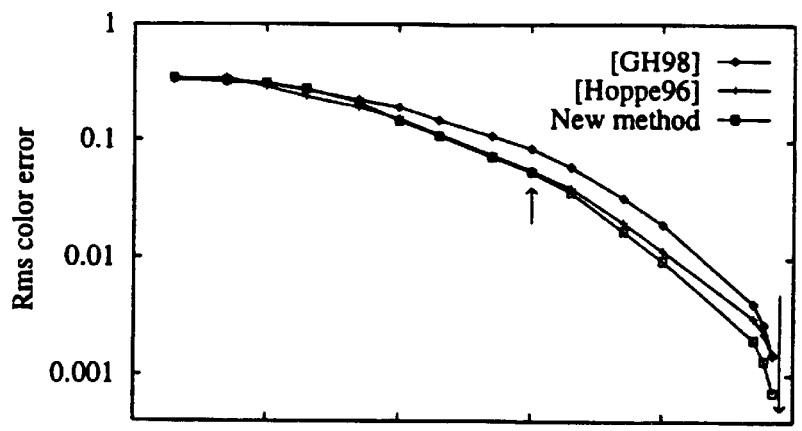
FIGS. 9(*a*) and 9(*b*) show graphs of rms color error vs. number of faces and maximum color error vs. number of faces, respectively, for an exemplary data set when processed by the quadric error metric of the present invention and prior art techniques.
Figure 9:
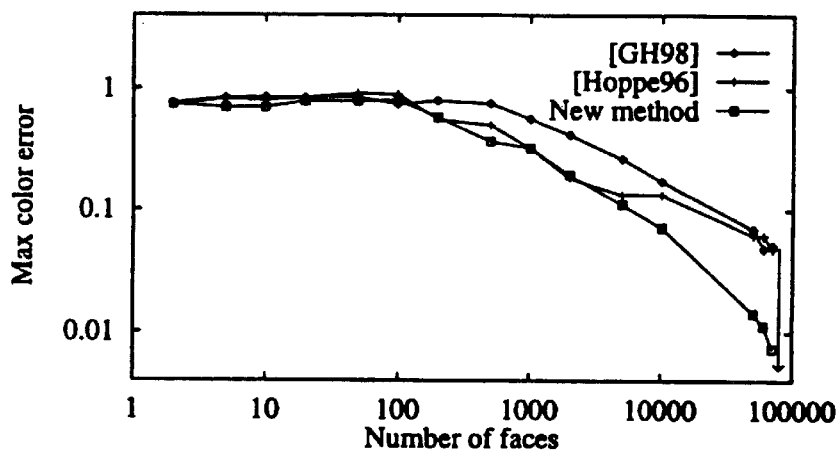

FIGS. 9(a) and 9(b) show graphs of rms color error vs. number of faces and maximum color error vs. number of faces, respectively, for an exemplary data set (a planar mesh) when processed by the quadric error metric of the present invention and prior art techniques. The QEM of the present invention clearly outperforms the previous QEM schemes of Garland98 and Hoppe96, often requiring less than half as many faces for the same rms error.

Table 2 shows quantitative accuracy results for the exemplary data set to represent images in Garland98 (row 1), the QEM of the present invention (row 2), and the QEM of the present invention with memoryless simplification and volume preservation. As shown, the QEM of the present invention, with and without the memoryless simplification, provides results that are superior to the prior art.

TABLE 2

| Simplification Option | rms color error | max color error |
|---|---|---|
| Garland98 | 0.086 | 0.57 |
| QEM of the present invention | 0.068 | 0.48 |
| including memoryless simplification and volume preservation | 0.054 | 0.33 |

Conclusions

The quadric error metric of the present invention is directed to simplifying triangle meshes with appearance attributes. The new metric captures both geometric error and attribute error based on closest-point correspondence in 3D, rather than in an abstract higher-dimensional space. The new metric produces more accurate simplifications. Moreover, it requires less storage and evaluates more quickly.

Associating the quadrics with a wedge-based data structure permits efficient simplification of models with attribute discontinuities. The techniques of memoryless simplification and volume preservation further improve results.

Thus, the present invention provides an improved quadric error metric for simplifying meshes with attributes. The metric of the present invention offers the following advantages: (1) it more intuitively measures error based on geometric correspondence in $R^3$; (2) it uses less storage because its space complexity is linear on the number of attributes; (3) it evaluates more quickly since the quadric matrix is sparse; and (4) it results in more accurate simplifications.

It is contemplated that parametric error (instead of geometric error) can be measured for the simplification of texture-coordinate attributes.

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalents thereto.

I claim:

1. A computer based method for generating a data structure that models the outer surface geometry of a three-dimensional object to be rendered, comprising:
   (a) generating a first mesh representation of the object, wherein the first mesh comprises a first number of vertices and faces spanning the vertices, wherein each vertex has an associated geometric position and an appearance attribute; and
   (b) generating a second mesh representation of the object, wherein the second mesh is created by performing an edge collapse transformation on the first mesh, wherein the edge collapse transformation yields a new vertex (v) having an associated geometric position p and appearance attribute $s=(s_1 \ldots s_m)$, wherein values for p and s are selected by determining values of p and s that minimize a quadric error metric, $$Q^f\left(\hat{v} = \binom{p}{s}\right) = Q_p^f(v) + \sum_{j=1}^{m} Q_{sj}^f(v)$$

wherein the geometric error $Q_p^f(v)$ is the squared distance from p to its projection p' onto a face f, and the attribute error $Q_{sj}^f(v)$ is the squared deviation between $s_j$ and the value $s_j'$ interpolated from the face f at the projected point p'.

2. A method according to claim 1, wherein the attribute error comprises a sparse m×m matrix, where m is the number of appearance attributes.

3. A method according to claim 2, wherein the sparse matrix is an identity matrix.

4. A method according to claim 1, wherein the value of s' at the projected point p' on the face f is determined by interpolation of the values of the appearance attribute at the vertices of the face.

5. A method according to claim 1, wherein the face f is adjacent the collapsed edge.

6. A method according to claim 1, further comprising the step of forming the quadric error metric at the new vertex (v) as the sum of a plurality of quadric error metrics, each of the plurality of quadric error metrics associated with a respective face about the collapsed edge.

7. A method according to claim 1, wherein the first mesh comprises attribute discontinuities and at least one of the vertices of the first mesh has a plurality of attribute values, and further comprising:
   partitioning the new vertex into a number of wedges, each wedge having an associated attribute value, wherein the wedge attribute values for the new vertex at point p are determined by minimizing the quadric error metric.

8. A method according to claim 1, further comprising:
   (c) generating a third mesh representation of the object using memoryless simplification in which the third mesh is created by minimizing the quadric error metric using values for p and s as determined by the generation of the second mesh.

9. A method according to claim 1, further comprising constraining the position p of the new vertex using a volume preservation linear constraint to prevent geometric shrinkage.

10. A computer based system for generating a data structure that models the outer surface geometry of a three-dimensional object to be rendered, comprising:
   a data store for storing data representative of the outer surface geometry of the three-dimensional object; and
   a processor for reading the data store, generating a first mesh representation of the object, wherein the first mesh comprises a first number of vertices and faces spanning the vertices, wherein each vertex has an associated geometric position and an appearance attribute, and generating a second mesh representation of the object, wherein the second mesh is created by performing an edge collapse transformation on the first mesh, wherein the edge collapse transformation yields a new vertex (v) having an associated geometric position p and appearance attribute $s=(s_1 \ldots s_m)$, wherein values for p and s are selected by determining values of p and s that minimize a quadric error metric, $$Q^f\left(v = \begin{pmatrix} p \\ s \end{pmatrix}\right) = Q_p^f(v) + \sum_{j=1}^{m} Q_{s_j}^f(v)$$

wherein the geometric error $Q_p^f(v)$ is the squared distance from p to its projection p' onto a face f, and the attribute error $Q_{s_j}^f(v)$ is the squared deviation between $s_j$ and the value $s_j'$ interpolated from the face f at the projected point p'.

11. A system according to claim 10, wherein the attribute error comprises a sparse m×m matrix, where m is the number of appearance attributes.

12. A system according to claim 11, wherein the sparse matrix is an identity matrix.

13. A system according to claim 10, wherein the processor determines the value of s' at the projected point p' in the face f by interpolation of the values of the appearance attribute at the vertices of the face.

14. A system according to claim 10, wherein the face f is adjacent the collapsed edge.

15. A system according to claim 10, wherein the quadric error metric at the new vertex (v) is the sum of a plurality of quadric error metrics, each of the plurality of quadric error metrics associated with a respective face about the collapsed edge.

16. A system according to claim 10, wherein the first mesh comprises attribute discontinuities and at least one of the vertices of the first mesh has a plurality of attribute values, and the processor partitions the new vertex into a number of wedges, each wedge having an associated attribute value, wherein the wedge attribute values for the new vertex at point p are determined by minimizing the quadric error metric.

17. A system according to claim 10, wherein the processor generates a third mesh representation of the object using memoryless simplification in which the third mesh is created by minimizing the quadric error metric using values for p and s as determined by the generation of the second mesh.

18. A system according to claim 10, wherein the processor constrains the position p of the new vertex using a volume preservation linear constraint to prevent geometric shrinkage.

19. A data structure stored in a computer readable memory created by the method recited in claim 1.

20. A data structure stored in a computer readable memory that approximates an outer surface geometry of a three-dimensional object to be rendered in a computer graphics system using a mesh representation, wherein the mesh representation comprises vertices and faces spanning the vertices, wherein the data structure comprises a data field containing a quadric error metric representing a summation of a quadric geometric error and a quadric attribute error, wherein the quadric error metric is useable to define a vertex having an associated geometric position p and appearance attribute s, wherein values for p and s are selectable by determining values of p and s that minimize the quadric error metric, wherein the geometric error is the squared distance from p to its projection p' onto a face f, and the attribute error is the squared deviation between s and the value s' interpolated from the face f at the projected point p'.

* * * * *